US008745092B2

(12) United States Patent
Vinnakota et al.

(10) Patent No.: US 8,745,092 B2
(45) Date of Patent: Jun. 3, 2014

(54) DYNAMICALLY WEIGHTED SEMANTIC TREES (75) Inventors: Devicharan Vinnakota, Karnataka (IN); Anil Babu Ankisettipalli, Karnataka (IN); Suresh Pasumarthi, Karnataka (IN)

(73) Assignee: Business Objects Software Limited, Dublin (IE)

( * ) Notice: Subject to any disclaimer, the term of this patent is extended or adjusted under 35 U.S.C. 154(b) by 447 days.

(21) Appl. No.: 12/960,568

(22) Filed: Dec. 6, 2010

(65) Prior Publication Data
US 2012/0143920 A1 Jun. 7, 2012

(51) Int. Cl.
G06F 7/00 (2006.01)

(52) U.S. Cl.
USPC .......................................... 707/794; 707/831

(58) Field of Classification Search
USPC ................. 707/797, 828–831, 778, 794, 748; 709/228, 252
See application file for complete search history.

(56) References Cited

U.S. PATENT DOCUMENTS

| | | | | |
|---|---|---|---|---|
| 4,769,772 | A * | 9/1988 | Dwyer | 707/714 |
| 2007/0038610 | A1 * | 2/2007 | Omoigui | 707/3 |
| 2008/0178092 | A1 | 7/2008 | Schmidt et al. | |
| 2008/0319947 | A1 | 12/2008 | Latzina et al. | |
| 2009/0313041 | A1 * | 12/2009 | Eder | 705/2 |
| 2009/0328016 | A1 | 12/2009 | Ng et al. | |
| 2010/0070448 | A1 * | 3/2010 | Omoigui | 706/47 |

OTHER PUBLICATIONS

Kemafor Anyanwu, Angela Madu Ko & Amit Sheth; SemRank: ranking complex relationship search results on the semantic web; Proceedings of the 14th international conference on World Wide Web; 2005; ACM, New York, USA; (http://portal.acm.org/citation.cfm?id=1060745.1060766).

Kemafor Anyanwu & Amit Sheth; The ρ Operator: Discovering and Ranking Associations on the Semantic Web; Newsletter, ACM SIGMOD Record, vol. 31 Issue 4; Dec. 2002; ACM, New York, USA; (http://portal.acm.org/citation.cfm?id=637418).

Massimo Franceschet; PageRank: Stand on the shoulders of giants; Feb. 2010; eprint arXiv:1002.2858; ARXIV; Ithaca, NY, USA; (http://arxiv.org/PS_cache/arxiv/pdf/1002/1002.2858v3.pdf).

Cory Doctorow; Metacrap: Putting the torch to seven straw-men of the meta-utopia; Aug. 26, 2010; The WELL, San Francisco, CA, USA; (http://www.well.com/~doctorow/metacrap.htm).

Catherine Plaisant; The challenge of information visualization evaluation; AVI '04 Proceedings of the working conference on Advanced visual interfaces; 2004; ACM, New York, USA; (http://portal.acm.org/citation.cfm?doid=989863.989880).

(Continued)

*Primary Examiner* — James Trujillo
*Assistant Examiner* — Linh Black (57) ABSTRACT

Various embodiments of systems and methods for dynamically weighted semantic trees are described herein. One or more software elements of a hierarchy are identified in response to user actions in a report. The user actions are related to at least one software element of the one or more software elements of the hierarchy. A local tree is constructed for each user by assigning local weights for the one or more software elements based on user visits to the one or more software elements. A group tree is constructed for each group to which the users belong by assigning group weights for the one or more software elements based on the user visits to the one or more software elements. The local tree and the group tree are stored for use in various applications.

24 Claims, 10 Drawing Sheets

(56) References Cited

OTHER PUBLICATIONS

Pohl M, Wiltner S and Miksch S; Exploring Information Visualization—Describing Different Interaction Patterns; The Beliv Workshop; Mar. 2010; Atlanta, USA; (http://www.beliv.org/papers/beliv2010/Research%20Papers/11-Exploring%20Information%20Visualization_Pohl,Wiltner,Miksch.pdf.pdf).

Chamei Chen and Yue Yu; Empirical studies of information visualization: a meta-analysis; Journal International Journal of Human-Computer Studies—Empirical evaluation of information visualizations; Nov. 2000; vol. 53 Issue 5; Elsevier—Academic Press, Rio de Janeiro, Brazil; (http://www.pages.drexel.edu/~cc345/papers/ijhcs2000b.pdf).

\* cited by examiner

DYNAMICALLY WEIGHTED SEMANTIC TREES

FIELD

The field relates generally to business intelligence tools. More particularly, the field is related to dynamic creation of semantic trees for business intelligence applications.

BACKGROUND

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, customer, and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data.

Business Intelligence documents contain vast amounts of data that may be spread across several databases and numerous tables. Also, data usage in business intelligence documents can be different in different scenarios. A user's area of interest may be limited to few regions in the underlying elements (e.g. semantics) of the data. There can also be several personas using a same document. Such data usage can be analyzed and leveraged for providing various functionalities and features. But considering the amount of data in business intelligence documents and the dynamic nature of documents, analysis of data usage can be extremely tedious and process intensive.

It would therefore be desirable to dynamically assign weights for underlying elements of data based on data usage. The weights can then be used for providing various functionalities.

SUMMARY

Various embodiments of systems and methods for dynamically weighted semantic trees are described herein. One or more software elements of a hierarchy are identified in response to user actions in a report. The user actions are related to at least one software element of the one or more software elements of the hierarchy. A local tree is constructed for each user by assigning local weights for the one or more software elements based on user visits to the one or more software elements. A group tree is constructed for each group to which the users belong by assigning group weights for the one or more software elements based on the user visits to the one or more software elements. The local tree and the group tree are stored for use in various applications such as, for example, tag generation applications.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for dynamically weighted semantic trees are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
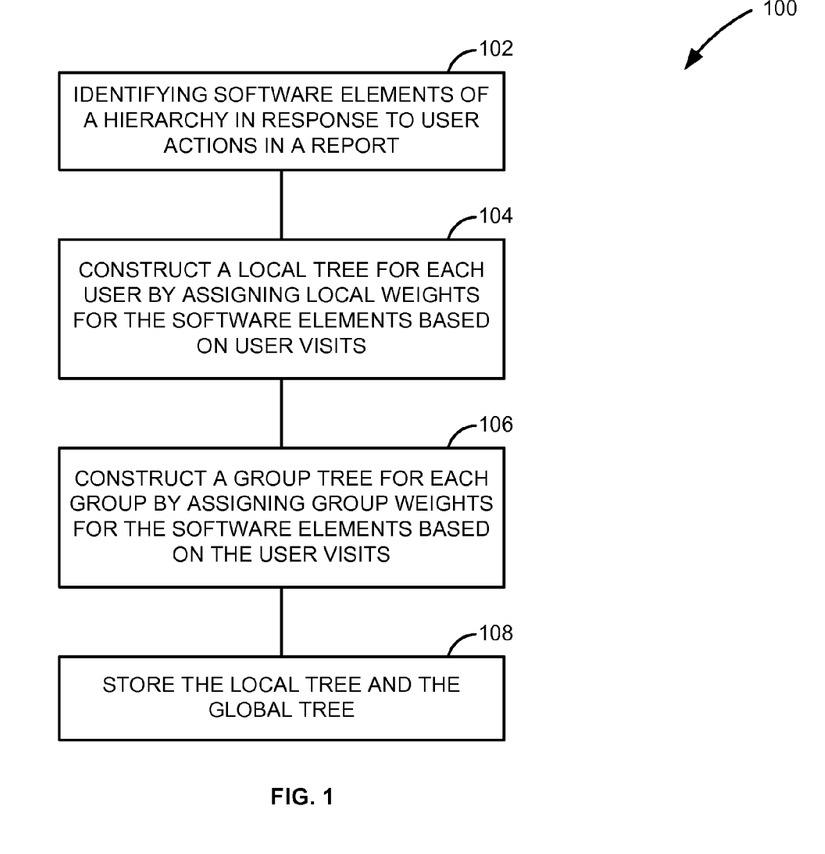
FIG. 1 is a flow diagram illustrating a dynamic weighing method based on data usage in business intelligence applications, according to one embodiment.

FIG. 1 illustrates an embodiment of a dynamic weighing method based on data usage. At 102, software elements of a hierarchy are identified in response to user actions in a report of an application. A user may be interested only in a fraction of the data in a data source. A user can select combinations of data to perform operations such as generating a report. The report can include any visual representation (e.g. tabular, chart, map etc.) of the selected data. Typically, the data in a data source is structured or categorized in a hierarchy. The data is categorized into several levels and sub-levels of hierarchical software elements. These software elements represent the category of the data. Based on the data selected by the user, the underlying software elements of the selected data are identified at 102.

In one embodiment, in the context of business intelligence applications (e.g. SAP® Business Objects), the software elements can be semantic elements of a semantic layer data source. In business intelligence applications, user interfaces are provided to retrieve data (e.g. using queries) into a document and generate a variety of reports using the retrieved data. In another embodiment, the software elements can be hierarchical content elements of a content management system.

The software elements can be represented by a hierarchical arrangement of root nodes and sub-nodes. Each node represents a software element. A plurality of sub-nodes can branch out from each root node. Each sub-node can, in turn, can have other sub-nodes. In one embodiment, a hierarchy includes a root node and all the lower level nodes emanating from the root node. Several such hierarchies form an entire hierarchy for all the underlying software elements of data in a data source (e.g. a data warehouse or a database). In one embodiment, if at least one underlying software element of a hierarchy is related to user actions, then all the software elements of that hierarchy are identified and used to construct the local tree.

At 104, at least one local tree is constructed for each user by assigning weights for the software elements that are identified at 102. The local tree is a hierarchical structure with weighted software elements. Weights are assigned to the software elements based on the user visits to the software elements. If a user selects particular data or user actions are related to particular data, the underlying software elements of the selected data are considered as visited by the user. If a software element is visited for a first time by a user, a weight is assigned for at least the visited software element. If the same software element is visited for a second time by the same user, an incremental weight is assigned and added to the existing weight of the software element. In this way, local trees are constructed for each user.

At 106, a group tree is constructed for each group to which users belong. Each group consists of a set of users. The group tree is also a hierarchical structure with weighted software elements. For a group tree, weights are assigned to the software elements based on the user visits to the software elements by any of the users of that group. Many users of the group can visit the software elements. There will be a first user visit to a software element, i.e. the software element is visited for the first time by a user of the group. For a first user visit to a software element, a weight is assigned for at least the visited software element. If the same software element is visited by any of the users in the group, an incremental weight is assigned and added to the existing weight of the software element. Similarly, group trees for all groups are constructed.

At 108, the local trees and the group trees are stored. The trees can be stored on server side after each weight assignment to software elements. The weights in the stored local trees and the group trees are updated for subsequent user visits. The stored trees can be used for several purposes. For example, the weights of the software elements can be used for ranking in search applications and for predictive algorithms. The software elements of the trees can also be used to automatically generate tags. Each software element can be used as a tag. The weight of a tag can be determined by the weight of the software element in the local tree and the group tree. In one example, an average or weighted average of weight of the software element in the local tree and the group tree can be taken. The tags can be then be presented to a user. Tag presentation can be related to the weight of the tags. For example, if a tag cloud is presented to the user, weight of the tags can be related or proportional to display size, display form, or other display parameter of the tags.

Figure 2A:
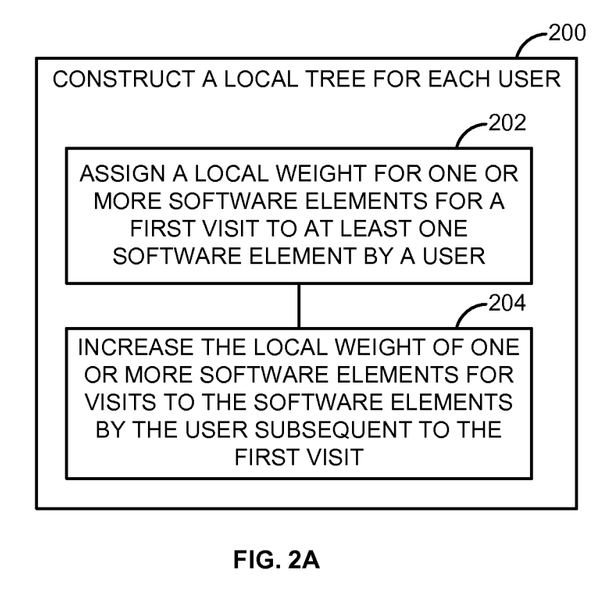
FIG. 2A is a flow diagram illustrating construction of a local tree, according to another embodiment.

FIG. 2A illustrates an embodiment of construction of local tree 200. The construction of the local tree 200 can be divided into two scenarios. If a software element is visited for a first time by a user, a local weight is assigned to all the software elements of a hierarchy at 202. The visited software element can be any node in the hierarchy. As cited previously, the hierarchy includes a root node and all the lower level nodes emanating from the root node. If the same software element is visited by the same user subsequent to first visit (e.g. a second visit) in the same report or in any other report, the local weight is increased for the software elements of the hierarchy at 204. The local weight can be variably increased. In one embodiment of variable increase, the amount of increase in local weight can be decreased for subsequent visits. For example, the increase in weight for a third visit to the software elements can be less than the increase in weight for a second visit to the software elements.

In another embodiment of variable increase, the local weight for a software element that is subsequently visited is increased to a greater degree compared to other software elements in the hierarchy. These other software elements can be above or below the level of the visited software element. User actions for generating a report can result in visiting of a lowest hierarchical software element. In which case, the local weight of the lowest hierarchical software element is increased to a greater degree compared to other software elements in the hierarchy.

The local weight of the software elements can also be increased in subsequent visits based on a time parameter, a location parameter, a peer parameter, a user role parameter, and a report parameter. If a user spends more time on a particular software element, then the local weight for that software element is increased further while keeping weights of other software elements constant. In this case, the time parameter can be the duration of time spent by the user on a software element. User actions such as cursor movements and position can be used to decide the time spent by the user on a software element. Also, in one embodiment, to consider that an element is visited, a user need to spend a minimum time on the element. This minimum time can be configured while implementing the dynamic weighing method.

If a user is present at a location such as a city or a state, then the local weight of the location semantic elements are increased to a greater extent compared to other software elements. For example, if a user is in a city 'k,' then the local weight of the city 'k' semantic element is increased to a greater extent compared to other software elements. Report parameter can include frequency of usage of a report. If a particular report is being used more, then the local weight of the software elements of that report can be increased to a greater degree.

User role parameter considers the role of a user belonging to a group. For a user with a higher role, the local weight of the software elements is increased to a greater degree. Consider that a user 'm' has a higher role compared to user 'n.' A local tree 'm' is created for the user 'm' and a local tree 'n' is created for the user 'n' with same software elements. The weights of the software elements in local tree 'm' are increased to a greater degree compared to the weights of software elements in local tree 'n.'

Figure 2B:
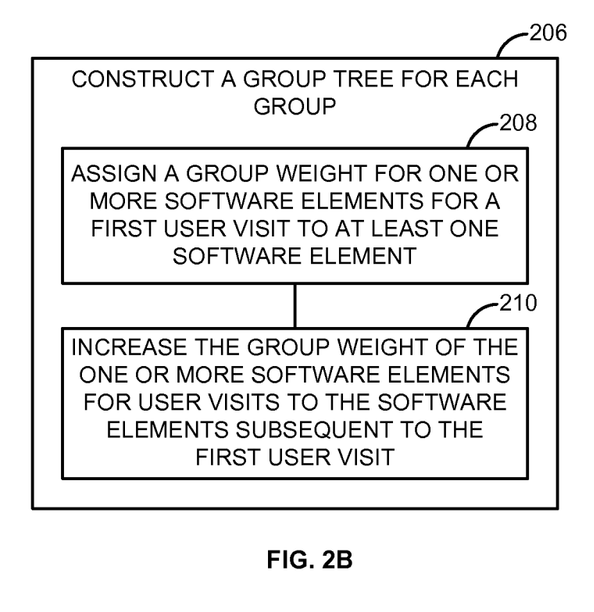
FIG. 2B is a flow diagram illustrating construction of a group tree, according to another embodiment.

FIG. 2B illustrates an embodiment of construction of a group tree 206. The construction of the group tree can also be divided into two scenarios. For a first user visit to a software element by any of the users of a group, a group weight is assigned to the software elements in the hierarchy at 208. Considering an example in which a plurality of users belong to a group '1.' A group tree is constructed for group '1' for user visits by the users of the group. If a semantic element is visited for the first time (i.e. a first user visit) by a user of the group '1,' then a group weight is assigned to all the software elements in the hierarchy.

The group weight is increased for following user visits that are subsequent to the first user visit at 210. Considering the example of group '1,' if the same software element is visited for a second time (i.e. second user visit) either by the same user or any other user of the group, then the group weight of at least the visited software element is increased. As in the case of local weight, the group weight can also be increased variably. In one embodiment, the group weight of the visited software element can be increased to a greater degree compared to the group weight of other software elements in the hierarchy.

In another embodiment, the amount of increase in group weight can be decreased for subsequent user visits. For example, the increase in weight for a third user visit can be less than can the increase in weight for a second user visit. In another example, the group weight for a third user visit by a user '1' can be increased to lesser degree compared to the increase in weight for a second user visit by the user '1.' In other embodiments, similar to the procedure used for increasing local weight, the group weight can also be increased in subsequent visits based on a time parameter, a location parameter, a peer parameter, a user role parameter, and a report parameter.

Figure 3:
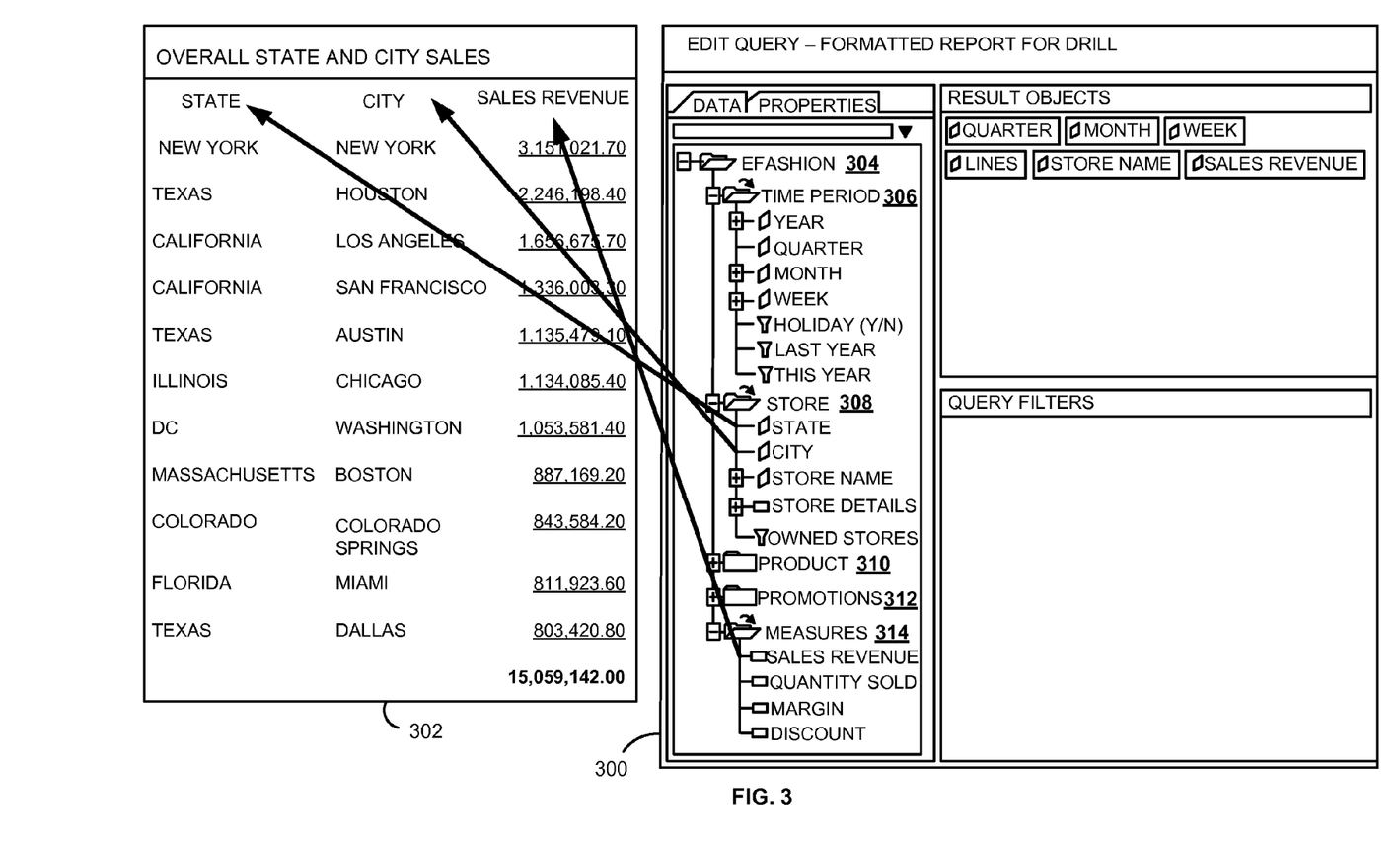
FIG. 3 is a block diagram illustrating exemplary user interfaces of a business intelligence application, according to one embodiment.

FIG. 3 illustrates an embodiment of exemplary user interfaces of a business intelligence application. The user interfaces shown are a reporting tool 300 and a report 302 generated using the reporting tool 300. A user can generate various reports using the reporting tool 300. In one embodiment, the reporting tool 300 shows underlying semantic elements of data in the left pane. The semantic elements are arranged in hierarchies. An entire hierarchy 304 (E FASHION) includes a plurality of hierarchies such as a time period hierarchy 306, store hierarchy 308, product hierarchy 310, promotions hierarchy 312, and measures hierarchy 314.

The report is generated by a user '1' to view sales revenue from stores. The user performs actions on the reporting tool for generating report. For example, the user can select state, city, and sales revenue and perform a querying operation for generating the sales revenue report. Therefore, the semantic elements that are visited by the user can be determined as the store element, state element, city element, measures element, and sales revenue element. The store element, the state element, and the city element are part of the store hierarchy 308 and the measures element and sales revenue element are part of the measures hierarchy 314. For the user '1' who generated the report, a first local tree is constructed by assigning local weights to the store element, the state elements, and the city elements of the store hierarchy 308 and a second local tree is constructed by assigning weights to the measures elements and sales revenue elements of the measures hierarchy 314. An embodiment of first and second local trees is shown in FIG. 4.

Figure 4:
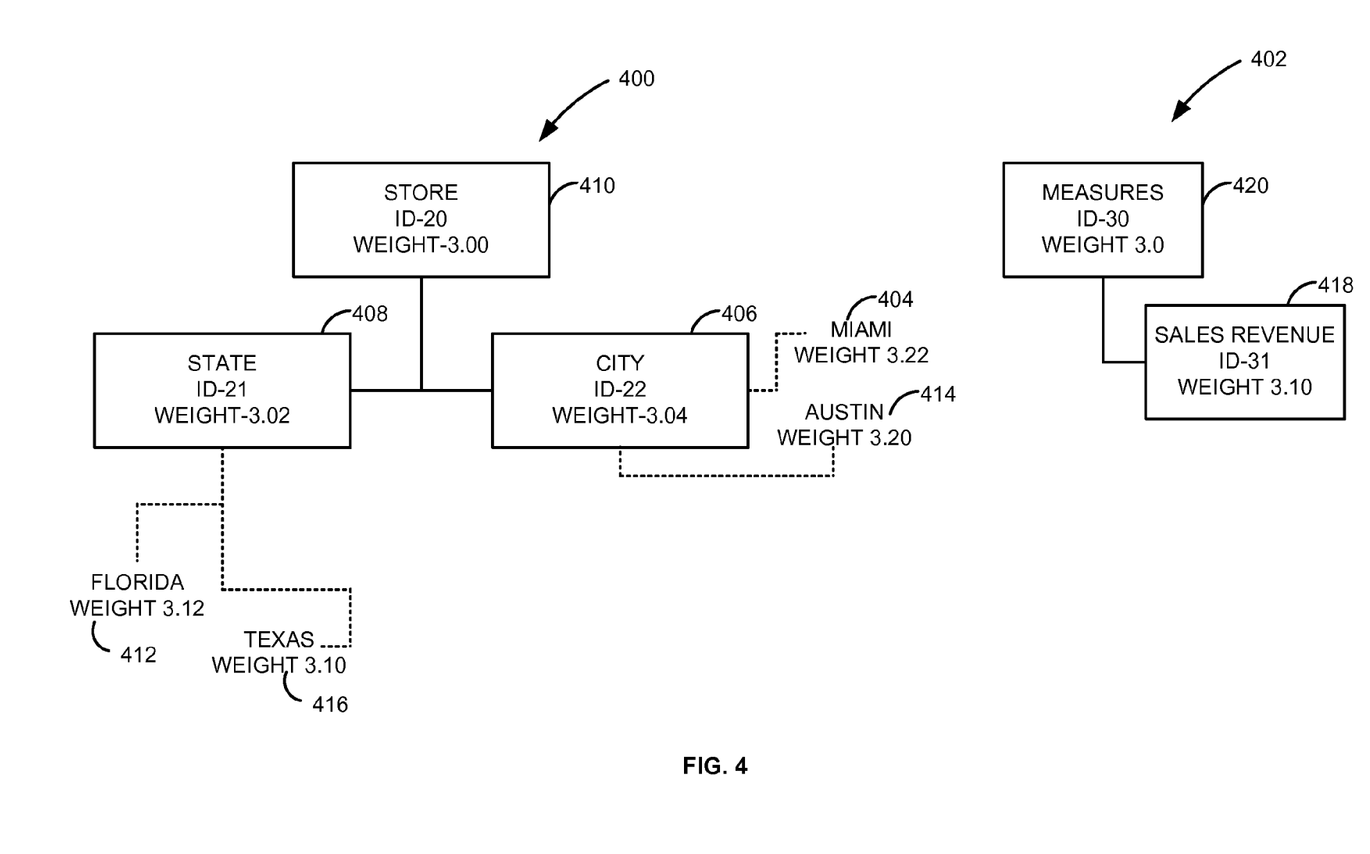
FIG. 4 is a block diagram illustrating exemplary local trees, according to one embodiment.

Referring to FIG. 4, a first local tree 400 is constructed by assigning weights to the semantic elements in the store hierarchy and a second local tree 402 constructed by assigning weights to the semantic elements in the measures hierarchy. The first local tree 400 is the result of a plurality for visits by the user '1.' The user '1' may be interested in only some of the cities. The user's interest can be deciphered from the user actions. For example, the user '1' may select a particular city (e.g. Miami) for a more detailed data. The selected city is identified and then a local weight is assigned to Miami element 404, the city element 406, the state element 408, and the store element 410. If the user visits the Miami element 404 again (i.e. selects Miami again), the local weight of Miami element 404 is increased and the local weight of other semantic elements can be left unchanged or increased variably. In one embodiment, the local weight is increased variably by increasing the local weight of the city element 406 to a lesser degree compared to increase in local weight of the Miami element 404. The local weight of the Florida element 412 can be increased to a lesser degree compared to increase in local weight of the Miami element 404 and the local weight of the state element 408 can be increased to a lesser degree compared to increase in local weight of the Florida element 412. The local weights can be similarly increased for user visits to other specific city elements such as Austin 414 and specific state elements such as Texas 416.

The second local tree 402 is also the result of a plurality of visits by the user '1' to the sales revenue element 418. The sales revenue element 418 and the measures element 420 are identified based on user's selection actions. A local weight is assigned to sales revenue element 418 and the measures element 420. If the user visits the sales revenue element 418 again, the local weight of sales revenue element 418 is increased and the local weight of the measures element 420 can be left unchanged or increased variably.

Figure 5A:
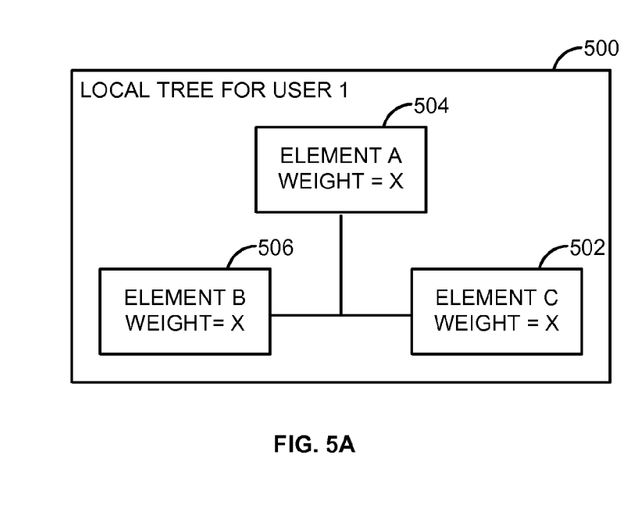
FIGS. 5A and 5B are block diagrams illustrating an exemplary local tree and an exemplary group tree for a user visit by a first user, according to one embodiment.
Figure 5B:
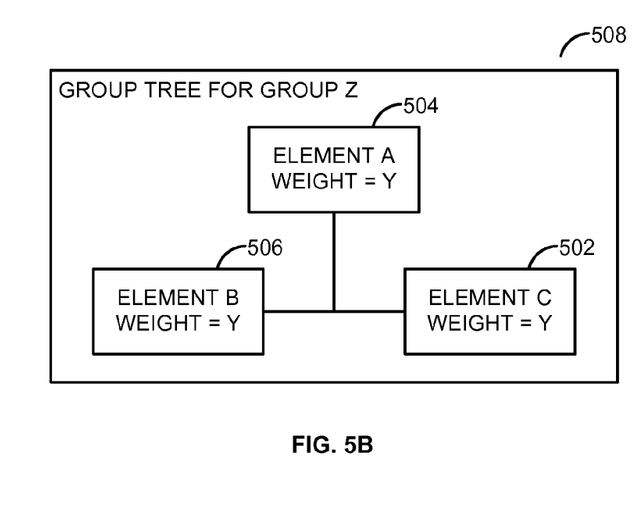

FIG. 5A illustrates a block diagram of a local tree 500 constructed for user '1' for a first visit to the element C 502 by the user '1'. Element A 504, element B 506, and element C 502 are part of a hierarchy. A local weight 'X' is assigned for all the elements (A, B and C) of the hierarchy for the user '1.' The user '1' belongs to a group 'X.' Therefore, as shown in FIG. 5B, a group tree 508 for the group 'Z' is also constructed for the visit to the element C 502 by the user '1' by assigning a group weight Y to all the elements of the hierarchy. If a user belongs to more than one group, then a group tree is constructed for each group.

Figure 6A:
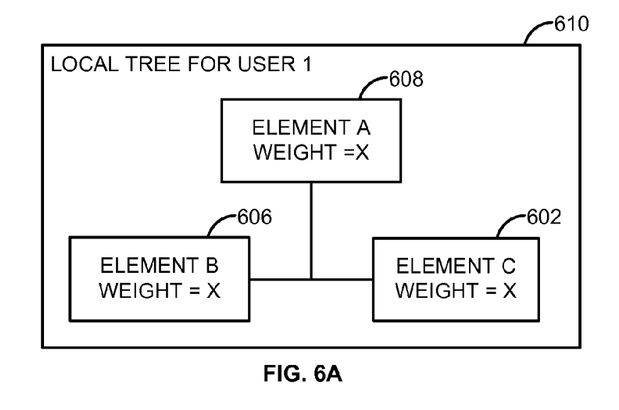
FIGS. 6A-6C are block diagrams illustrating exemplary local trees for two users and the corresponding group tree for a user visit by a second user, according to one embodiment.
Figure 6B:
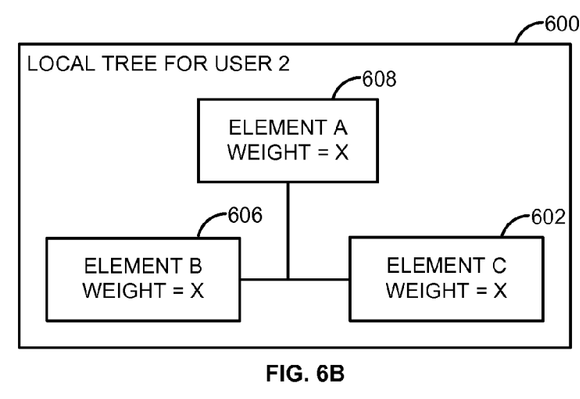
Figure 6C:
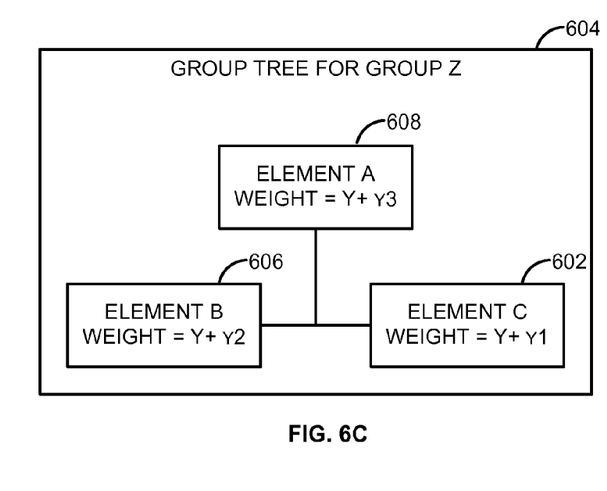

Referring to FIGS. 6A to 6C, consider that a user '2' who belongs to the group 'X' visits element C after the visit by the user '1'. A local tree 600 for user '2' is then constructed by assigning a local weight X to all the elements of the hierarchy. Since the user '2' also belongs to group 'Z' and it is the second user visit to the element C 602, the group weights in the group tree 604 are increased. The group weights can be increased variably. For example the group weight for element C 602 is increased by Y1, the group weight for the element B 606 is increased by Y2, and the group weight for element A 608 is increased by Y3, wherein:

Y1>Y2>Y3

For example, if Y=3, then Y1 can be 0.3, Y2 can be 0.2, and Y3 can be 0.1. The group weight of the lowest hierarchical element C is increased to a greater degree (i.e. Y1) compared to the increase in weights (i.e. Y2 and Y3) for elements B and A. The local tree 610 of user '1' is left unchanged.

Figure 7A:
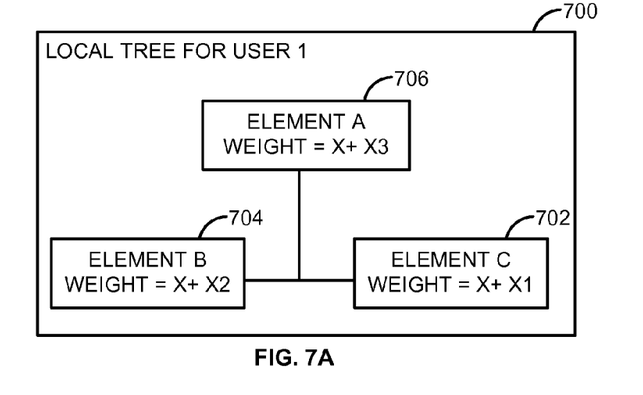
FIGS. 7A-7C are block diagrams illustrating the local trees and the corresponding group tree for with increased weights for a second visit by the first user, according to one embodiment.
Figure 7B:
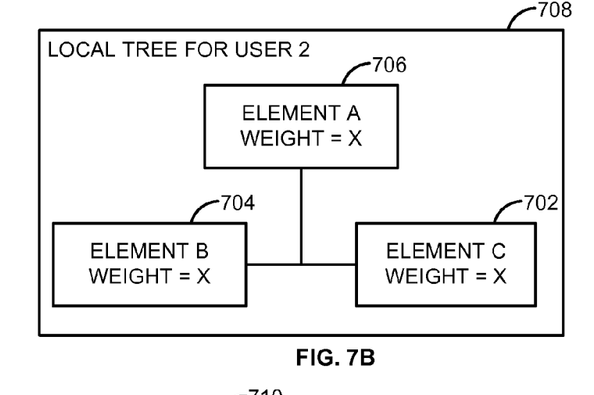
Figure 7C:
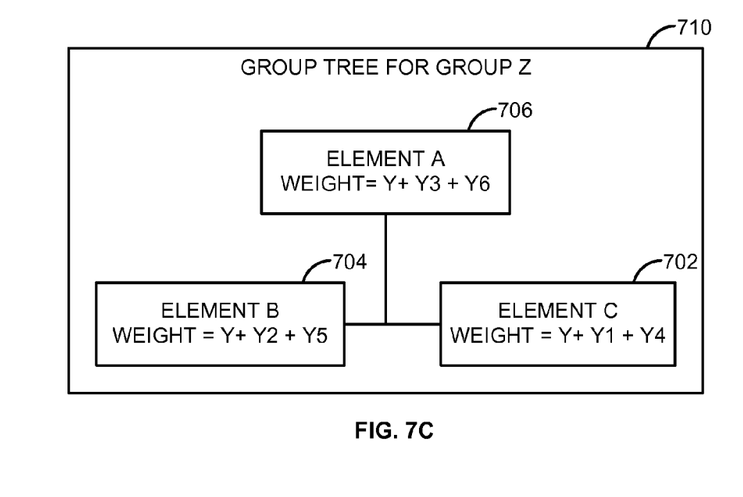

Referring to FIGS. 7A to 7C, the local tree 700 for the user '1' is updated by increasing the local weights of the elements 702, 704, 706 if the user '1' visits the element C 702 again. The local weights can be increased variably. For example, the local weight for element C 702 is increased by X1, the local weight for the element B 704 is increased by X2, and the local weight for element A 706 is increased by X3: where X1>X2>X3. The local weight of the lowest hierarchical element C is increased to a greater degree (i.e. X1) compared to the increase in weights (i.e. X2 and X3) for elements B and A. The local tree 708 of user '2' is left unchanged. Since this is the third user visit to the element C 702, the group weights in the group tree 710 are increased. The group weights can be increased variably. For example, the group weight for element C 702 is increased by Y4, the group weight for the element B 704 is increased by Y5, and the group weight for element A 706 is increased by Y6, where:

Y4>Y5>Y6;

Y1>Y4;

Y2>Y5;

Y3>Y6;

It can be observed that the local and group trees are dynamically created based on user activities in the reports. Weights are assigned and increased without any user intervention. The local and group trees have latest weights based on data usage by various users at any given point in time.

Figure 8:
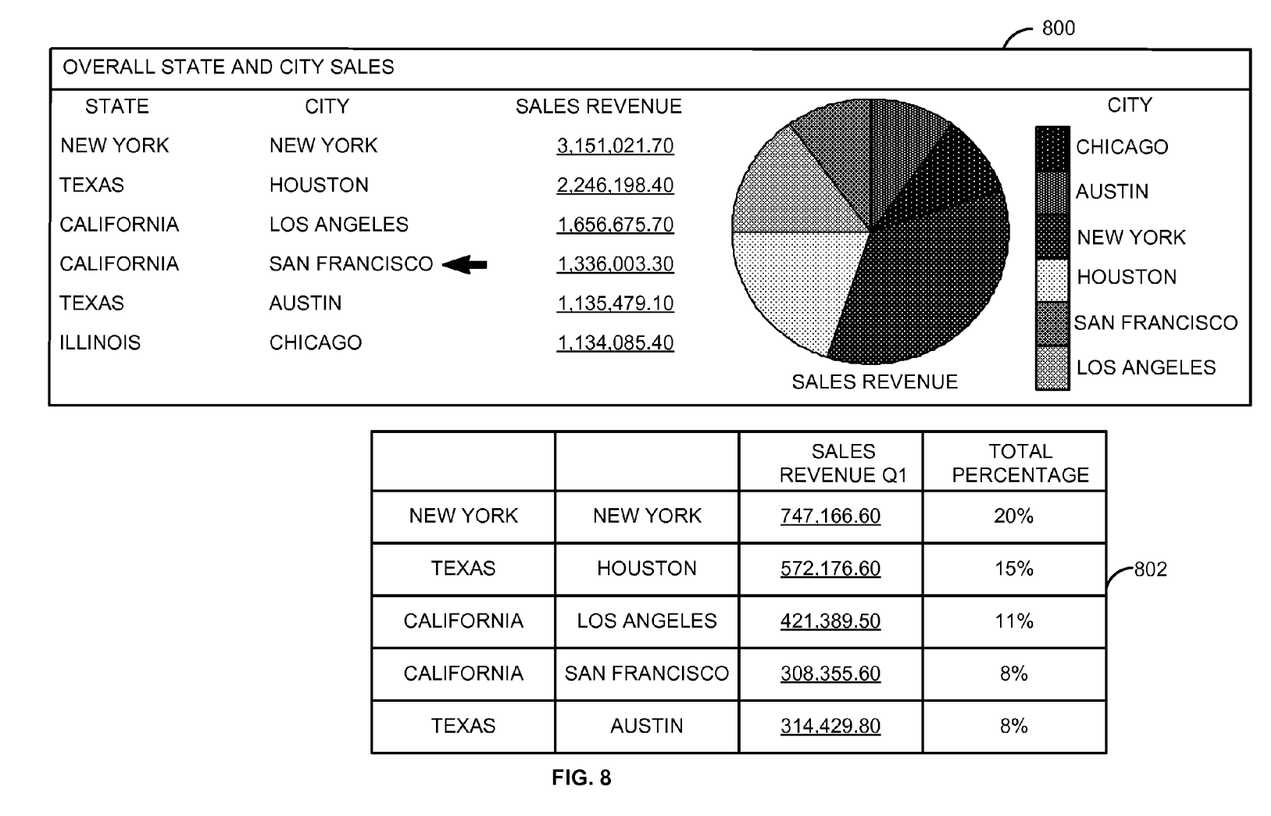
FIG. 8 is a block diagram illustrating exemplary reports, according to another embodiment.

FIG. 8 illustrates a block diagram of reports. In one embodiment the reports are Web Intelligence® reports generated using BI applications such as SAP® Business Objects. Software elements are identified in response to user actions in the reports. On the first report 800, the user may perform actions such as hovering on 'sales revenue' of 'New York' and drilling through 'San Francisco' by selecting the 'San Francisco' field. Cursor movements and location within a report screen can be analyzed to identify the elements in real-time. The cursor movements can be associated with mouse movements by a user. Biometric devices such as devices that capture eyeball movements can also be used to identify the elements. Cursor movements can be associated with eyeball movements of a user. Based on these user actions, New York element, San Francisco element, and California element are identified. These elements are part of a hierarchy and a local tree can be constructed by assigning weights as described previously. Also, the same elements can be used as tags.

On the second report 802, the user may perform actions such as hovering over the quarter '1' sales revenue figure of San Francisco. In response to this, San Francisco element, California element, Sales revenue element, and Q1 element can be identified. A local tree can then be constructed using at least these elements. In one embodiment, three local trees can be constructed for the same user. A first local tree for the store-state-city hierarchy, a second local tree for measures-sales revenue, and a third local tree for time period-year-quarter hierarchy.

Figure 9:
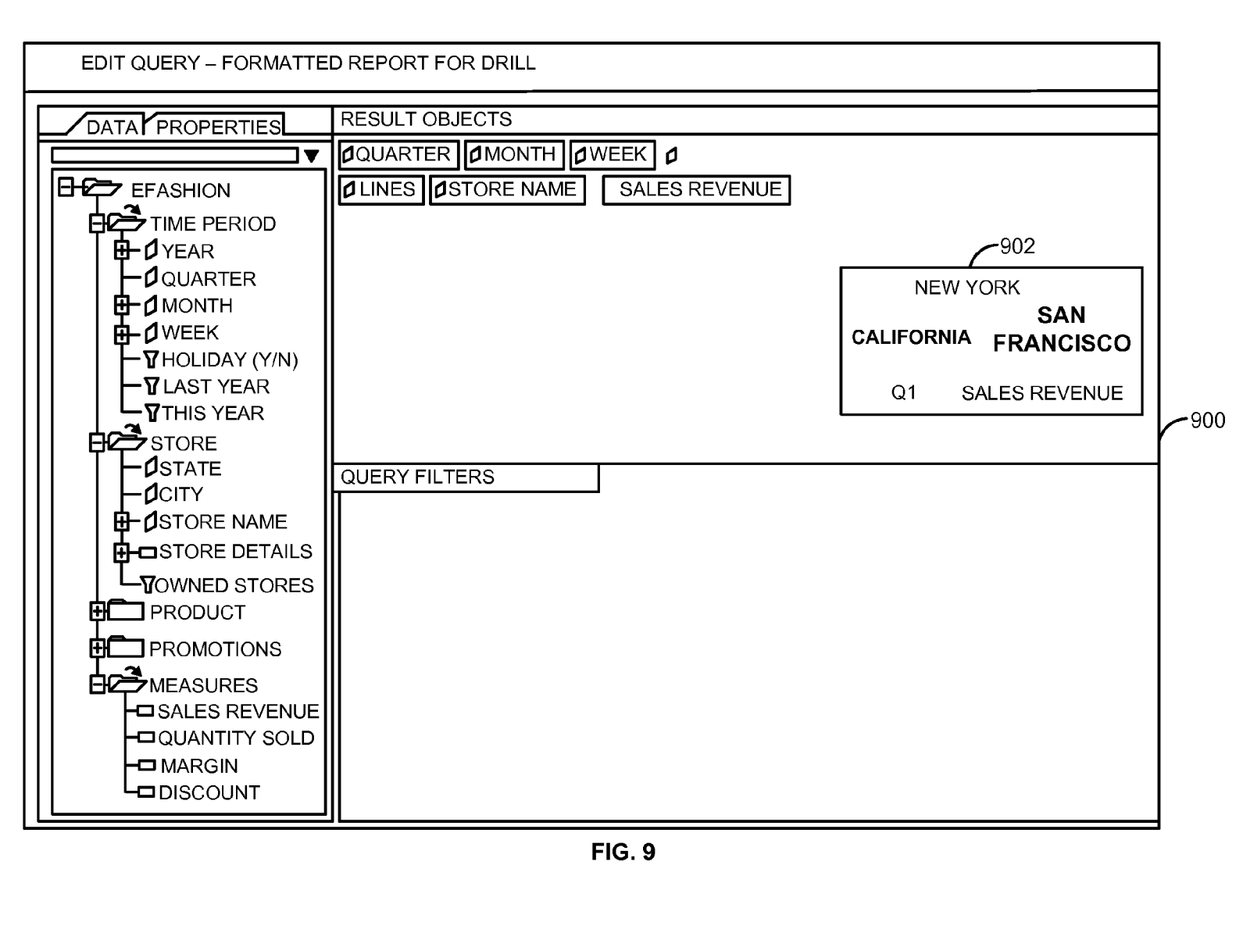
FIG. 9 is a block diagram illustrating an exemplary user interface with a tag cloud presentation, according to one embodiment

FIG. 9 illustrating an exemplary user interface 900 with a tag cloud 902 presentation according to one embodiment. The tags in the tag cloud 902 can be generated using the software elements in the local and group trees. Taking the elements referred in FIG. 8, the following tags can be displayed in the tag cloud: New York, San Francisco, Calif., Sales revenue, and Q1. The display weight or size of the tags is proportional to their weights in the stored local and group trees. Tags are typically entered by a user. According to the dynamic weighing method, by using weights of the software elements of the stored local trees and group trees, tags are automatically created without any user intervention and displayed on relevant user interfaces.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
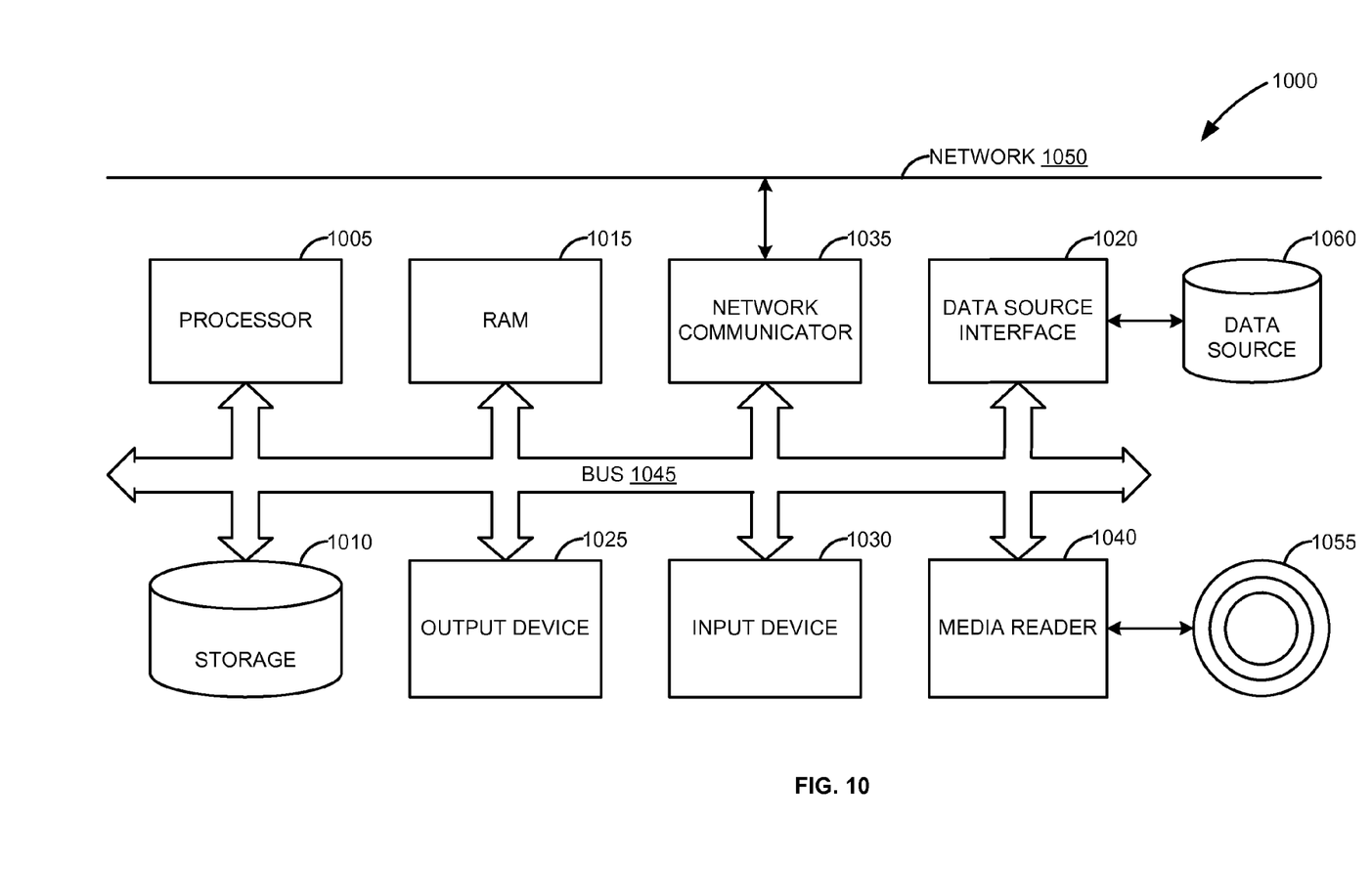
FIG. 10 is a block diagram of an exemplary computer system according to one embodiment.

FIG. 10 is a block diagram of an exemplary computer system 1000. The computer system 1000 includes a processor 1005 that executes software instructions or code stored on a computer readable storage medium 1055 to perform the above-illustrated methods of the invention. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   identify one or more software elements of a hierarchy in response to one or more user actions in a report, wherein the one or more user actions are related to at least one software element of the one or more software elements of the hierarchy;
   construct a local tree for one or more users by assigning local weights for the one or more software elements based on user visits to the one or more software elements, wherein constructing the local tree further comprising
      assign a local weight to the one or more software elements for a first visit to at least one of the one or more software elements by a user, and
      variably increase the local weight of the one or more software elements for one or more visits to at least one of the one or more software elements by the user subsequent to the first visit, wherein variably increase the local weight further comprising
         increase the local weight to a greater degree for a software element lowest in a hierarchy that is subsequently visited compared to other software elements in the hierarchy; and
         increase the local weight to a degree lesser than the greater degree for a software element at a higher level compared to the software element lowest in the hierarchy;
   construct a group tree for one or more groups to which the one or more users belong by assigning group weights for the one or more software elements based on the user visits to the one or more software elements; and
   store the local tree and the group tree.

2. The article of manufacture of claim 1, wherein the instructions to construct the group tree for the one or more groups to which the one or more users belong by assigning group weights for the one or more software elements, further comprises instructions to:
   assign a group weight to the one or more software elements for a first user visit to at least one of the software elements; and
   increase the group weight of the one or more software elements for one or more user visits to the software elements by the one or more users subsequent to the first user visit.

3. The article of manufacture of claim 2, wherein the instructions to increase the group weight further comprise instructions to:
   variably increase the group weight for the one or more user visits subsequent to the first user visit.

4. The article of manufacture of claim 3, wherein
   the instructions to variably increase the group weight further comprise instructions to:
      increase the group weight to a greater degree for a software element lowest in a hierarchy that is subsequently visited compared to other software elements in the hierarchy.

5. The article of manufacture of claim 2, wherein:
   the instructions to increase the local weight further comprise instructions to:

increase the local weight of at least one of the software elements for the one or more visits subsequent to the first visit based on parameters comprising at least one of a time parameter, a location parameter, a peer parameter, a user role parameter, and a report parameter; and the instructions to increase the group weight further comprise instructions to:

increase the group weight of at least one of the software elements for the one or more user visits subsequent to the first user visit based on parameters comprising at least one of a time parameter, a location parameter, a peer parameter, a user role parameter, and a report parameter.

6. The article of manufacture of claim 2, further comprising instructions which when executed by the computer further causes the computer to:

use the software elements as tags;

determine weight of the tags based on the local weights and group weights; and present the tags to the user.

7. The article of manufacture of claim 4, further comprising instructions which when executed by the computer further causes the computer to:

for a user with a higher role, increase the local weights of the software elements to a greater degree compared to other users, wherein the software elements comprise semantic elements of data used in the report and metadata of the semantic elements.

8. The article of manufacture of claim 4, wherein the user actions comprise at least one of cursor movements in a user interface of the report and selection operations in the user interface.

9. A computer-implemented dynamic weighing method based on data usage, the method comprising:

identifying one or more software elements of a hierarchy in response to one or more user actions in a report, wherein the one or more user actions are related to at least one software element of the one or more software elements of the hierarchy;

constructing a local tree for one or more users by assigning local weights for the one or more software elements based on user visits to the one or more software elements, wherein constructing the local tree further comprising assigning a local weight to the one or more software elements for a first visit to at least one of the one or more software elements by a user, and variably increasing the local weight of the one or more software elements for one or more visits to at least one of the one or more software elements by the user subsequent to the first visit, wherein variably increase the local weight further comprising increasing the local weight to a greater degree for a software element lowest in a hierarchy that is subsequently visited compared to other software elements in the hierarchy; and increasing the local weight to a degree lesser than the greater degree for a software element at a higher level compared to the software element lowest in the hierarchy;

constructing a group tree for one or more groups to which the one or more users belong by assigning group weights for the one or more software elements based on the user visits to the one or more software elements; and storing the local tree and the group tree.

10. The method of claim 9, wherein constructing the group tree for the one or more groups to which the one or more users belong by assigning group weights for the one or more software elements, further comprises:

assigning a group weight to the one or more software elements for a first user visit to at least one of the software elements; and increasing the group weight of the one or more software elements for one or more user visits to the software elements by the one or more users subsequent to the first user visit.

11. The method of claim 10, wherein increasing the group weight further comprises:

variably increasing the group weight for the one or more user visits subsequent to the first user visit.

12. The method of claim 11, wherein variably increasing the group weight further comprises:

increasing the group weight to a greater degree for a software element lowest in a hierarchy that is subsequently visited compared to other software elements in the hierarchy.

13. The method of claim 10, wherein:

increasing the local weight further comprises:

increasing the local weight of at least one of the software elements for the one or more visits subsequent to the first visit based on parameters comprising at least one of a time parameter, a location parameter, a peer parameter, a user role parameter, and a report parameter; and increasing the group weight further comprises:

increasing the group weight of at least one of the software elements for the one or more user visits subsequent to the first user visit based on parameters comprising at least one of a time parameter, a location parameter, a peer parameter, a user role parameter, and a report parameter.

14. The method of claim 10, further comprises:

using the elements as tags;

determining weight of the tags based on the local weights and group weights; and presenting the tags to the user.

15. The method of claim 12, further comprising:

for a user with a higher role, increasing the local weights of the software elements to a greater degree compared to other users, wherein the software elements comprise semantic elements of data used in the report and metadata of the semantic elements.

16. The method of claim 12, wherein the user actions comprise at least one of cursor movements in a user interface of the report and selection operations in the user interface.

17. A computer system for dynamic weighing based on data usage, comprising:

a computer memory to store program code; and a processor to execute the program code to:

identify one or more software elements of a hierarchy in response to one or more user actions in a report, wherein the one or more user actions are related to at least one software element of the one or more software elements of the hierarchy;

construct a local tree for one or more users by assigning local weights for the one or more software elements based on user visits to the one or more software elements, wherein constructing the local tree further comprising assign a local weight to the one or more software elements for a first visit to at least one of the one or more software elements by a user, and variably increase the local weight of the one or more software elements for one or more visits to at least one of the one or more software elements by the user subsequent to the first visit, wherein variably increase the local weight further comprising
increase the local weight to a greater degree for a software element lowest in a hierarchy that is subsequently visited compared to other software elements in the hierarchy; and
increase the local weight to a degree lesser than the greater degree for a software element at a higher level compared to the software element lowest in the hierarchy;
construct a group tree for one or more groups to which the one or more users belong by assigning group weights for the one or more software elements based on the user visits to the one or more software elements; and
store the local tree and the group tree.

18. The system of claim 17, wherein the program code to construct the group tree for the one or more groups to which the one or more users belong by assigning group weights for the one or more software elements, further comprises program code to:
assign a group weight to the one or more software elements for a first user visit to at least one of the software elements; and
increase the group weight of the one or more software elements for one or more user visits to the software elements by the one or more users subsequent to the first user visit.

19. The system of claim 18, wherein the program code to increase the group weight further comprises program code to:
variably increase the group weight for the one or more user visits subsequent to the first user visit.

20. The system of claim 19, wherein
the program code to variably increase the group weight further comprises program code to:
increase the group weight to a greater degree for a software element lowest in a hierarchy that is subsequently visited compared to other software elements in the hierarchy.

21. The system of claim 18, wherein:
the program code to increase the local weight further comprises program code to:
increase the local weight of at least one of the software elements for the one or more visits subsequent to the first visit based on parameters comprising at least one of a time parameter, a location parameter, a peer parameter, a user role parameter, and a report parameter; and
the program code to increase the group weight further comprises program code to:
increase the group weight of at least one of the software elements for the one or more user visits subsequent to the first user visit based on parameters comprising at least one of a time parameter, a location parameter, a peer parameter, a user role parameter, and a report parameter.

22. The system of claim 18, wherein the processor further executes the program code to:
use the elements as tags;
determine weight of the tags based on the local weights and group weights; and
present the tags to the user.

23. The system of claim 20, wherein the processor further executes the program code to:
for a user with a higher role, increase the local weights of the software elements to a greater degree compared to other users, wherein the software elements comprise semantic elements of data used in the report and metadata of the semantic elements.

24. The system of claim 20, wherein the user actions comprise at least one of cursor movements in a user interface of the report and selection operations in the user interface.

* * * * *